United States Patent
Andou et al.

(10) Patent No.: US 8,139,501 B2
(45) Date of Patent: Mar. 20, 2012

(54) RELAY DEVICE, WIRELESS COMMUNICATION SYSTEM AND MULTICAST RELAY METHOD

(75) Inventors: Tadanao Andou, Kawasaki (JP); Takeshi Asada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 684 days.

(21) Appl. No.: 11/867,776

(22) Filed: Oct. 5, 2007

(65) Prior Publication Data

US 2008/0107110 A1 May 8, 2008

(30) Foreign Application Priority Data

Nov. 6, 2006 (JP) .................................. 2006-300299

(51) Int. Cl.
*H04L 12/28* (2006.01)
*H04B 7/00* (2006.01)
(52) U.S. Cl. .......................... 370/254; 370/390; 455/519
(58) Field of Classification Search .................. None
See application file for complete search history.

(56) References Cited

U.S. PATENT DOCUMENTS

| | | | | |
|---|---|---|---|---|
| 6,647,020 | B1 * | 11/2003 | Maher et al. .................. | 370/432 |
| 7,400,601 | B2 * | 7/2008 | Moritani et al. .............. | 370/331 |
| 2002/0150094 | A1 * | 10/2002 | Cheng et al. .................. | 370/389 |
| 2003/0083087 | A1 * | 5/2003 | Ekl et al. ....................... | 455/518 |
| 2004/0202164 | A1 * | 10/2004 | Hooper et al. ................. | 370/390 |
| 2004/0203966 | A1 | 10/2004 | Tsukagoshi | |
| 2005/0129017 | A1 * | 6/2005 | Guingo et al. ................. | 370/390 |
| 2006/0007930 | A1 * | 1/2006 | Dorenbosch .................. | 370/390 |
| 2008/0069099 | A1 * | 3/2008 | Tani et al. ...................... | 370/390 |
| 2009/0207840 | A1 * | 8/2009 | McCanne ....................... | 370/390 |
| 2009/0279701 | A1 * | 11/2009 | Moisand et al. .............. | 380/270 |

FOREIGN PATENT DOCUMENTS

JP 2004-4251 1/2004

OTHER PUBLICATIONS

Korean Notification of Argument Submission dated Aug. 26, 2009, from the corresponding Korean Application.
Jeongmy Ha, et al. "A Multicast Scheme considering the Terminal Mobility in HMIPv6 Networks." Journal of the Korea Society for Simulation, vol. 14, Dec. 2005.
WiMAX Forum "A Technical Overview and Performance Evaluation" Mobile WiMAX—Part 1, Feb. 21, 2006.
European Search Report dated Sep. 25, 2009, from the corresponding European Application.
WiMAX Forum "Mobile WiMAX—Part 1: A Technical Overview and Performance Evaluation", Aug. 2006. Retrieved from http://www.wimaxforum.org/technology/downloads/Mobile_WiMAX_Part1_Overview_and_Performance.pdf.
"Universal Mobile Telecommunications System (UMTS); Multimedia Broadcast/Multicast Service (MBMS); Architecture and functional description (3GPP TS 23.246 version 6.10.0 Release 6)" ETSI Standards, ETSI TS 123 246 V6.10.0, Jun. 1, 2006.

* cited by examiner

*Primary Examiner* — Gregory Sefcheck
(74) *Attorney, Agent, or Firm* — Fujitsu Patent Center

(57) ABSTRACT

A relay device for multicast communications. The relay device transmitting a user data packet, containing a content, in which to set a multicast address associated with the content, to a plurality of base stations belonging to a same zone in order to wirelessly transmit the content substantially simultaneously from the plurality of base stations, comprises a storing unit storing information indicative of a multicast group in which the mobile terminal participates together with information about the zone to which the base station performing wireless communications with the mobile terminal belongs, and generates a query packet for checking if the mobile terminal continues to participate in the multicast group stored therein, and transmits the user data packet containing the query packet to each of the base stations belonging to the same zone.

6 Claims, 14 Drawing Sheets

FIG. 3

| MBS ZONE | BASE STATION DEVICE |
|---|---|
| ZONE#1 | BS1 |
| ZONE#1 | BS2 |
| ZONE#1 | BS3 |
| ZONE#2 | BS4 |
| ZONE#2 | BS5 |
|  |  |
|  |  |

FIG. 4

| MULTICAST ADDRESS | MBS ZONE | LAST RESPONDER |
|---|---|---|
| 224.22.3.45 | ZONE#1 | BS2 |
| 224.0.10.15 | ZONE#2 | BS4 |
|  |  |  |
|  |  |  |

FIG. 5

| GRE KEY | ZONE#1 (BUSINESS DISTRICT) | ZONE#2 (SHOPPING AREA) | ZONE#3 (RESIDENTIAL STREET) | MULTICAST ADDRESS | REMARKS |
|---|---|---|---|---|---|
| 0x00000001 | ○ | ○ | ○ | 224.3.5.30 | NEWS (TV) |
| 0x00000002 | ○ | ○ | ○ | 224.3.5.31 | SPORTS (TV) |
| 0x00000003 | ○ | ○ | ○ | 224.3.5.32 | WEATHER (TV) |
| 0x00000011 | ○ | ○ | | 224.5.12.50 | LUNCH INFORMATION |
| 0x00000012 | ○ | ○ | | 224.5.12.51 | PUB INFORMATION |
| 0x00000013 | ○ | ○ | | 224.5.12.52 | TRAIN INFORMATION |
| 0x00000031 | ○ | | | 224.8.52.22 | PROMPT REPORT OF STOCK PRICES |
| 0x00000032 | ○ | | | 224.8.52.23 | PROMPT REPORT OF EXCHANGE |
| 0x00000033 | ○ | | | 224.8.52.24 | BUSINESS TRIP INFORMATION |
| 0x00000041 | | ○ | | 224.7.5.45 | SHOP CM 1CH |
| 0x00000042 | | ○ | | 224.7.5.46 | SHOP CM 2CH |
| 0x00000043 | | ○ | | 224.7.5.47 | SHOP CM 3CH |
| 0x00000051 | | | ○ | 224.10.53.56 | LOCAL INFORMATION 1CH |
| 0x00000052 | | | ○ | 224.10.53.57 | LOCAL INFORMATION 2CH |
| 0x00000053 | | | ○ | 224.10.53.58 | LOCAL INFORMATION 3CH |

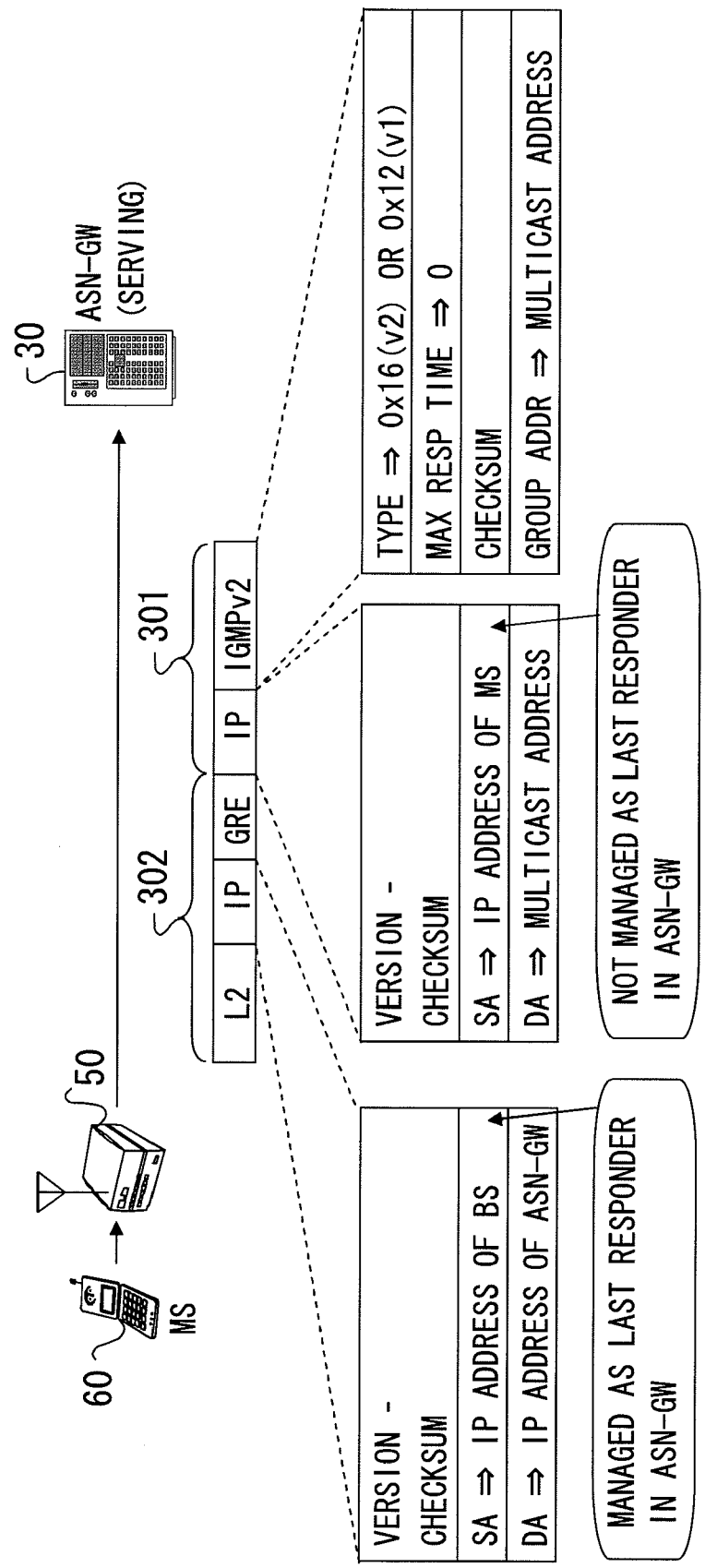

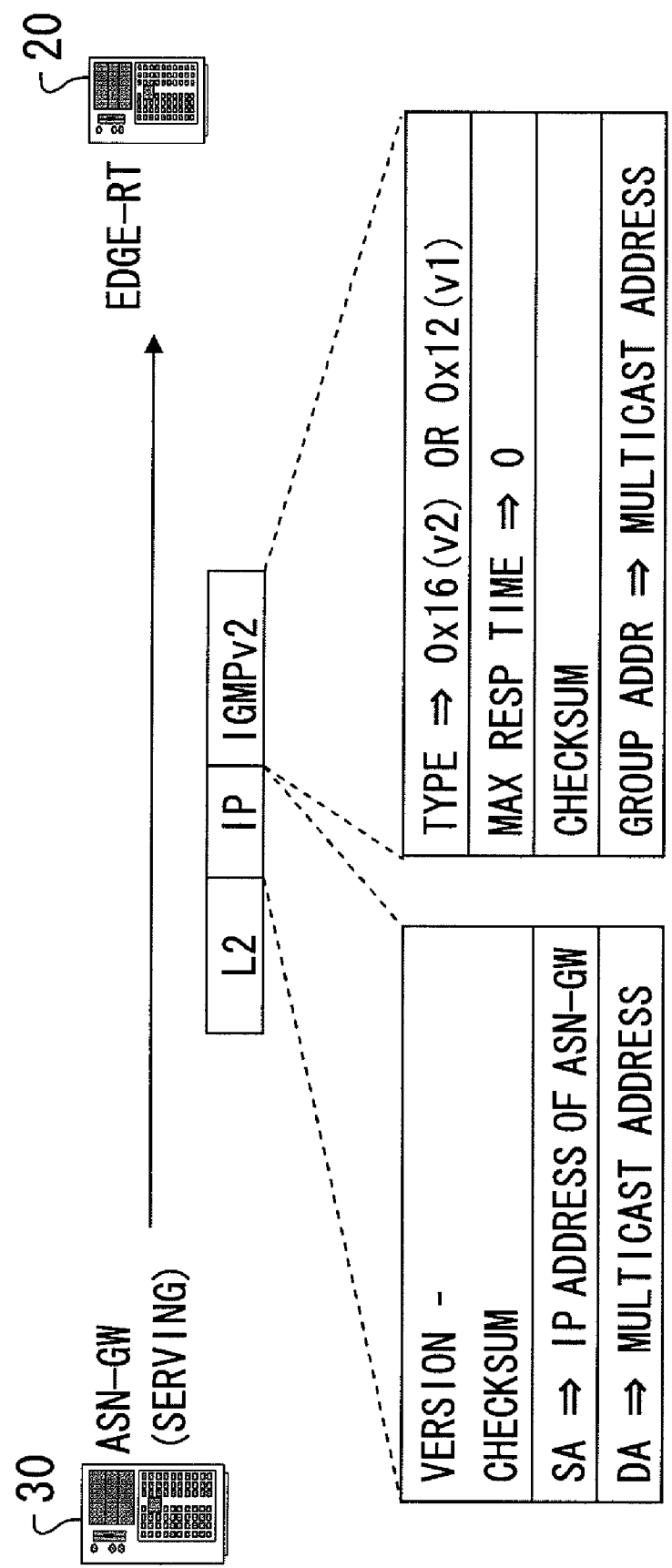

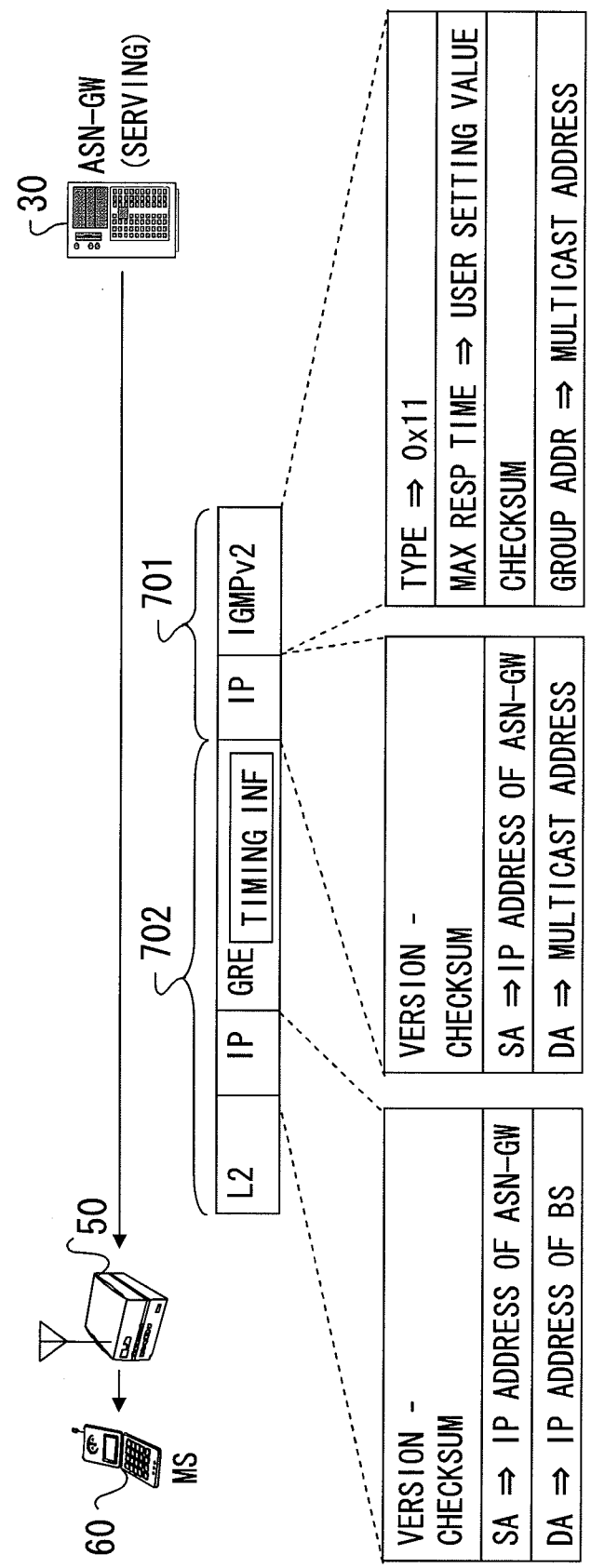

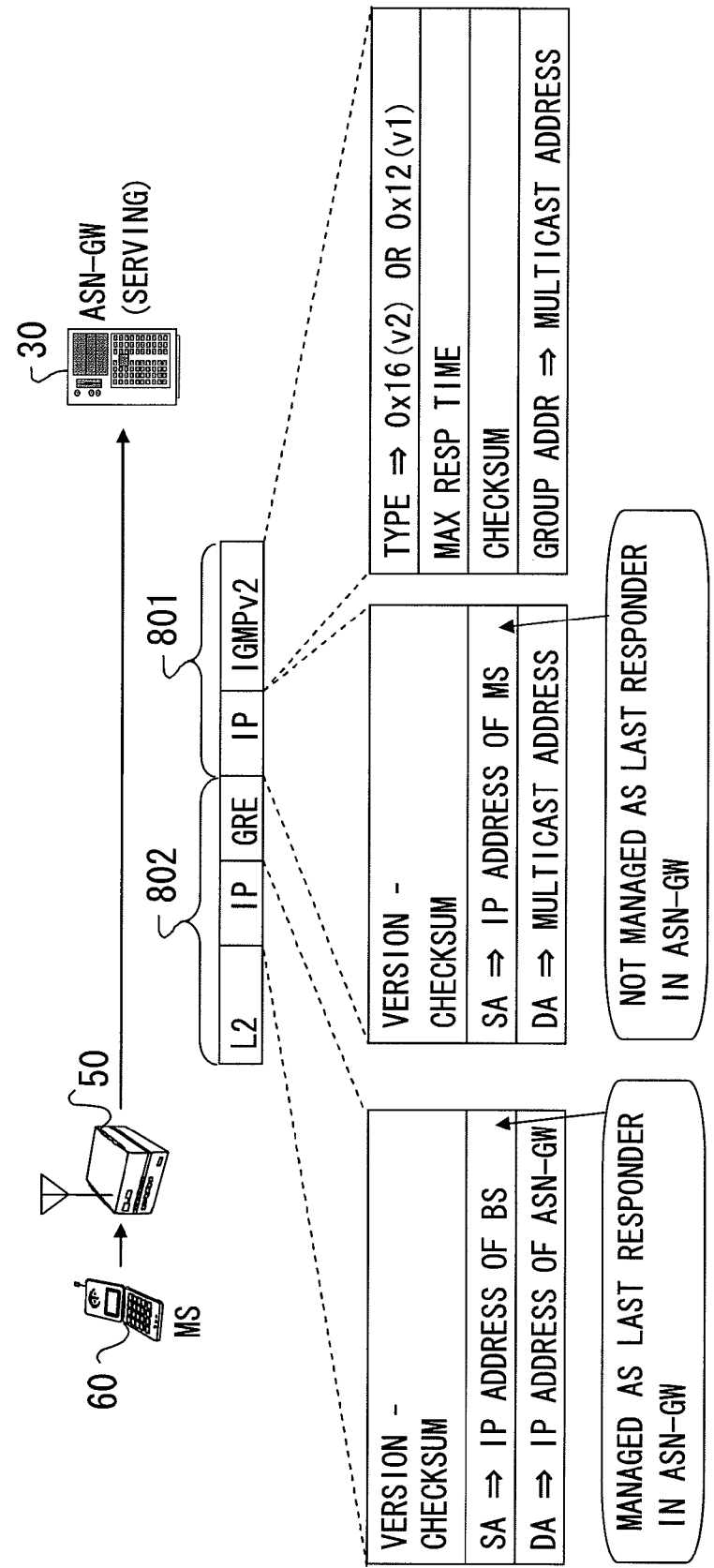

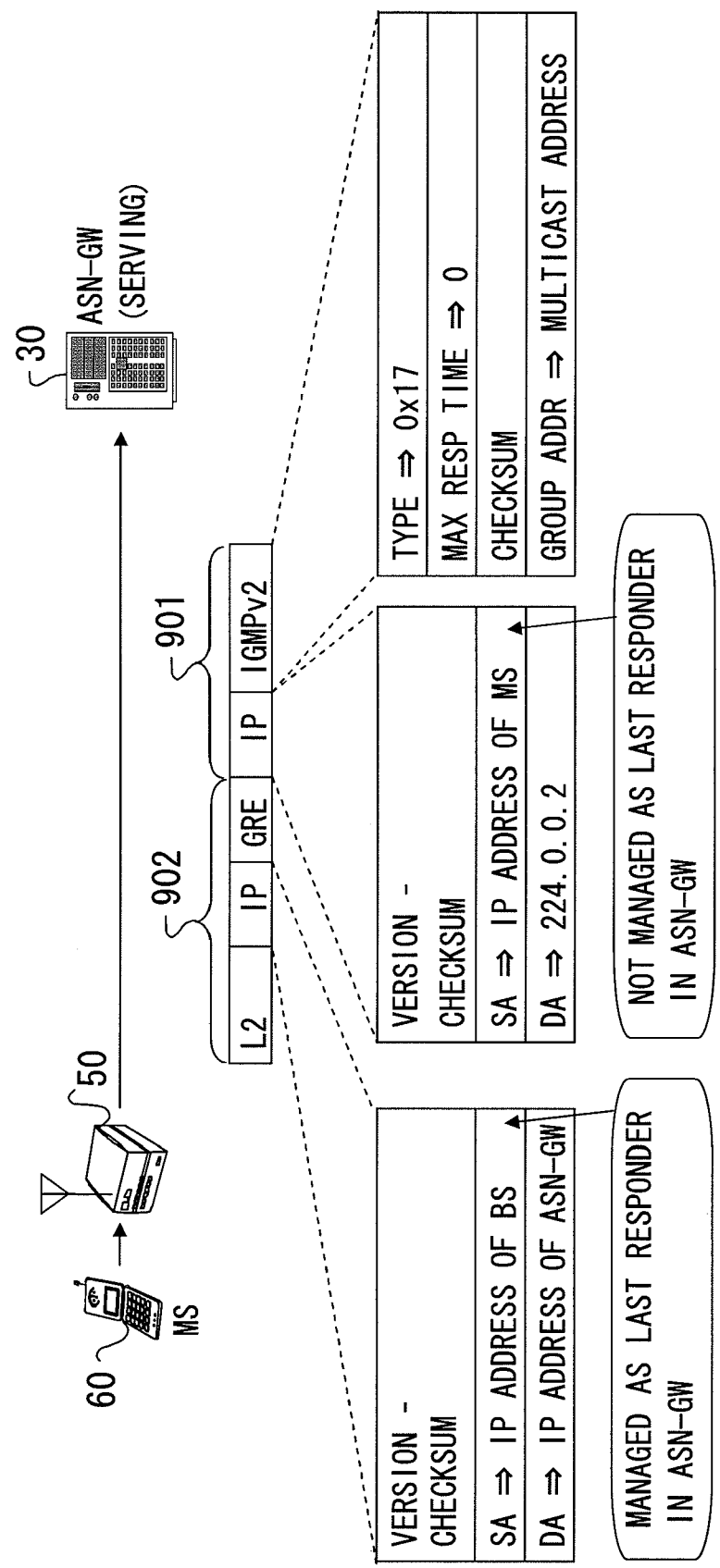

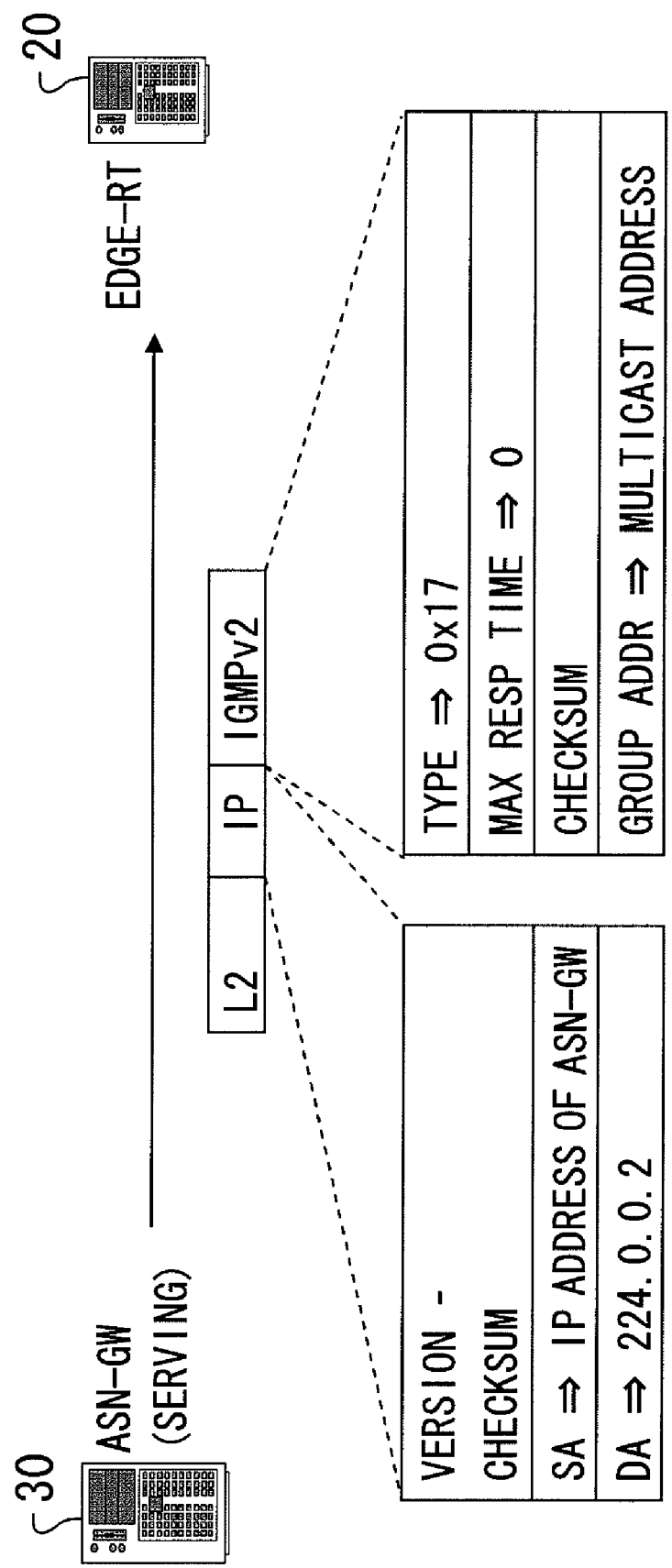

RELAY DEVICE, WIRELESS COMMUNICATION SYSTEM AND MULTICAST RELAY METHOD

BACKGROUND OF THE INVENTION

1. Field of the Invention

The present invention relates to a relay device, a wireless communication system and a multicast relay method that realize multicast communications efficient and effective in mobile communications.

2. Description of the Related Art

WiMAX (Worldwide Interoperability for Microwave Access) is defined as a fixed wireless communication technology based on IEEE802.16. Standardization of the WiMAX technology for providing a fast wireless communication service is in progress. The WiMAX Forum® is an industry-led organization established as an organization for promoting the WiMAX technology. Non-Patent document 1 given below is a document issued by the WiMAX Forum® as a technical overview about the WiMAX technology.

Non-Patent document 1 describes a purport of supporting a multi BS (Base Station)-MBS (Multicast Broadcast Service) in the WiMAX technology. Specifically, the wireless communication system using the WiMAX technology is requested to provide, through multicast communications, a variety of contents such as a news program, a sports program, a weather forecast and traffic information.

IGMP (Internet Group Management Protocol) and MLD (Multicast Listener Discovery) are employed as multicast group management protocols in a way that participates in and leaves a multicast group in the multicast communications using an IP (Internet Protocol) protocol. The IGMP is the multicast group management protocol that supports IPv4, and the MLD is the multicast group management protocol that supports IPv6.

Patent document 1 given below discloses a method of efficiently transmitting multicast data in a LAN (Local Area Network) that supports the multicast communications. According to this method, when receiving a packet utilized on the multicast group management protocol, a table representing an associative relation between a host device and the multicast group is generated based on the received packet. Forwarding control is done with reference to this table so as to forward, when receiving a query packet, this query packet to all of ports other than a port to which the received packet is inputted in a plurality of ports. According to this method, the query packet can be surely forwarded to under a multicast router.

The Patent document 1 is "Japanese Patent Application Laid-Open Publication No. 2004-4251".

The Non-Patent document 1 is "WiMAX Forum, "A Technical Overview and Performance Evaluation", Mobile WiMAX-Part 1, Feb. 16, 2006".

In real circumstances, however, none of the specific method for supporting the multi BS-MBS in the WiMAX technology is disclosed.

Especially in the wireless communication system using the WiMAX technology, the device provided with the multicast data is a mobile terminal, and hence, if the IGMP or the MLD is applied as it is, there might be a case where the multicast data can not be efficiently transmitted.

SUMMARY OF THE INVENTION

It is an object of the present invention to provide a relay device, a wireless communication system and a multicast relay method that realize multicast communications efficient and effective in mobile communications.

The present invention adopts the following configurations in order to solve the problems. Namely, the present invention is a relay device transmitting a user data packet, containing a content to be distributed to a mobile terminal, in which to set information on a multicast group associated with the content, to a plurality of base stations belonging to the same zone in order to wirelessly transmit the content substantially simultaneously from the plurality of base stations, comprising a storing unit storing information about a multicast group in which the mobile terminal participates together with information about the zone to which the base station performing wireless communications with the mobile terminal belongs, a generating unit generating a query packet, for checking existence of the mobile terminal continuing participation in the multicast group stored in the storing unit, in which to set information about the multicast group as the checking target, and a transmitting unit transmitting the user data packet containing the query packet generated by the generating unit to each of the base stations belonging to the zone stored together with the information about the multicast group as the checking target.

In the relay device according to the present invention, the information about the multicast group in which the mobile terminal participates is managed together with the zone to which the base station performing the wireless communications with a mobile terminal belongs. Existence of the mobile terminal continuing the participation in each multicast group is checked based on the information stored in the storing unit used for the management on a zone-by-zone basis. Hereat, the generated query packet is transmitted as the user data packet to each of the base stations belonging to the zone stored together with the information about the multicast group in the storing unit.

With this scheme, the respective base stations belonging to the same zone, which receive the user data packet containing the query packet, in the same way as transmitting a content, wirelessly transmit the query packet contained in the received user data packet, substantially simultaneously.

Thus, the relay device according to the present invention employs the same method as about the user data packet for multicasting for distributing the content on the occasion of transmitting the query packet, thereby enabling the multicast management protocol to be normally implemented if the mobile terminal exists in the same zone even when moving and enabling a participation continuing status to be normally grasped. Moreover, the multicast group management messages of which the necessity might arise due to the mobile terminal's moving between the base stations, can be reduced to the greatest possible degree.

Owing to this scheme, according to the present invention, it is feasible to perform the multicast communications efficient and effective in the mobile communications targeted at the mobile terminals on the premise that the mobile terminals are to move.

Further, the transmitting unit may set the same timing information in the user data packet containing the query packet generated by the generating unit, and may thereafter transmit the user data packet to each of the base stations.

With this contrivance, the base station conducts the wireless transmission at the timing specified by the timing information, whereby the query packet can be wirelessly transmitted by synchronizing with other base stations belonging to the same zone.

Furthermore, the relay device according to the present invention may further comprise a judging unit judging, when receiving a JOIN packet, sent from the mobile terminal, for a request for participating in a predetermined multicast group via any one of the plurality of base stations, whether or not the storing unit stores information about the predetermined multicast group being the target of the received JOIN packet with respect to the zone to which the via-base-station belongs, wherein the storing unit may store information about the multicast group as the judging target and information about the zone and may transfer the received JOIN packet to a high-order device when the judging unit judges that the storing unit does not store such an item of information, but may not transfer the received JOIN packet when the judging unit determines that the storing unit stores the information.

With this scheme, even in the case of transmitting the JOIN messages related to the same multicast group from the plurality of mobile terminals existing under the management of the same zone, it may simply be enough that any one of the JOIN messages is processed, and the other JOIN messages do not need transferring to a high-order device from the relay device.

Therefore, according to the present embodiment, a traffic size can be reduced on the occasion of providing the multicast communication services to the mobile terminals.

Further more, the present invention is an invention related to a wireless communication system comprising the relay device and the base station device, and is also an invention related to a multicast relay method by which a computer etc is made to actualize any one of the functions of the relay device. Still further, the present invention may also be a program that realizes any one of the functions described above, and may further be a readable-by-computer storage medium recorded with such a program.

According to the present invention, it is possible to provide the relay device, the wireless communication system and the multicast relay method that realize the multicast communications efficient and effective in the mobile communications.

BRIEF DESCRIPTION OF THE DRAWINGS

FIG. 3 is a diagram showing an example of a MBS zone information table within a MBS zone management database;

FIG. 4 is a diagram showing a multicast group information table within the multicast group management database;

FIG. 5 is a diagram showing an example of a tunnel information table within a tunnel information database;

FIG. 6 is a diagram showing a JOIN message sent to an ASN gateway from a base station;

FIG. 7 is a diagram showing the JOIN message sent to an edge router from the ASN gateway;

FIG. 8 is a diagram showing a membership query (Group Specific) message sent to the base station from the ASN gateway;

FIG. 9 is a diagram showing a membership report message sent to the ASN gateway from the base station as a response to the GS-query message;

FIG. 10 is a diagram showing a LEAVE message sent to the ASN gateway from the base station;

FIG. 11 is a diagram showing the LEAVE message sent to the edge router from the ASN gateway;

DESCRIPTION OF THE PREFERRED EMBODIMENTS

Embodiment

A multi BS-MBS system (which will hereinafter simply be referred to as a MBS system) in an embodiment of the present invention will hereinafter be described with reference to the drawings. It should be noted that a configuration in the following embodiment is an exemplification, and the present invention is not limited to the configuration in the embodiment. Further, the following discussion will deal with only a multicast communication service by the MBS system in the present embodiment, however, the MBS system may include other functions.

[System Architecture and Device Configuration]

Figure 1:
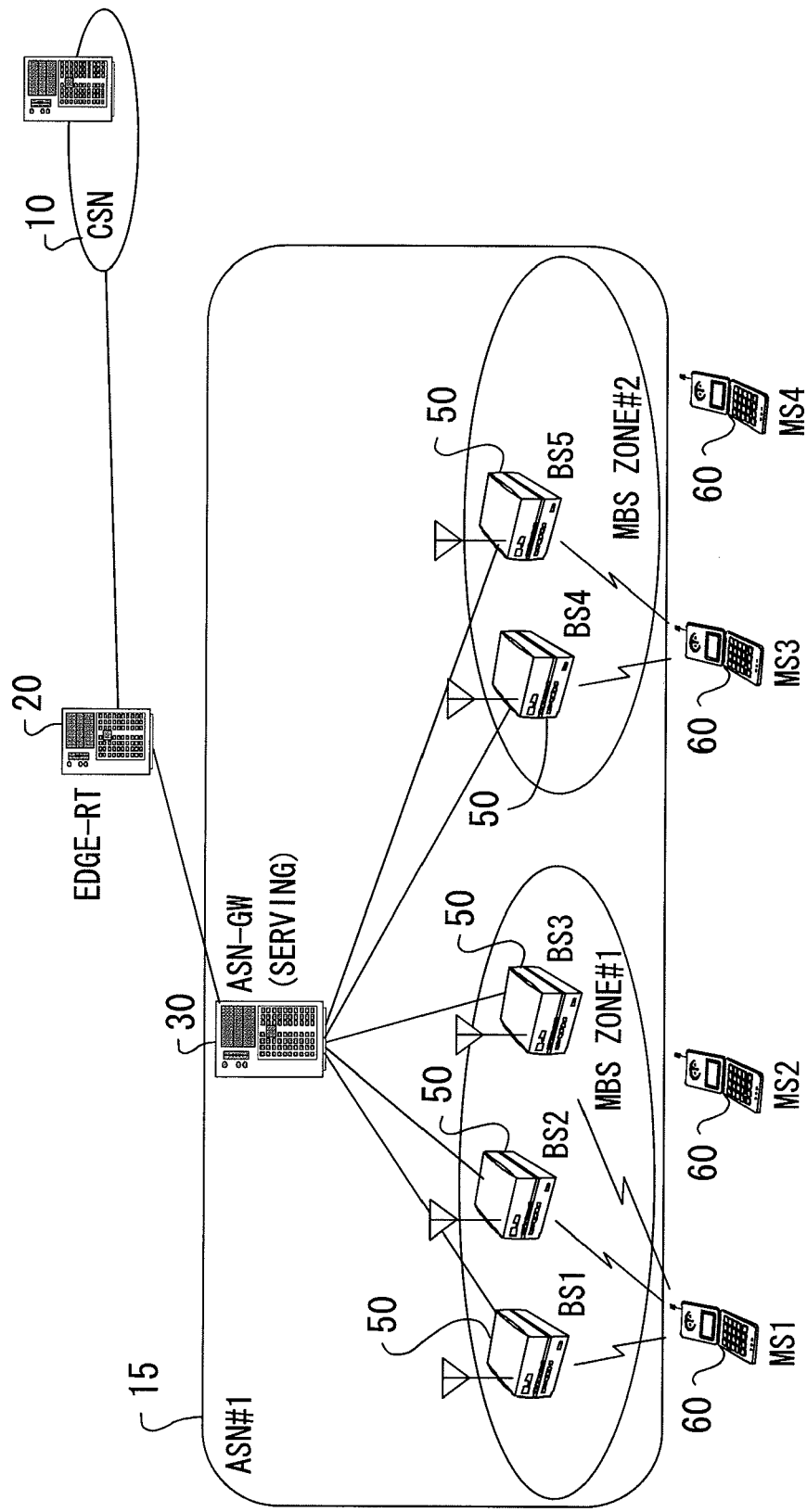
FIG. 1 is a view illustrating a system architecture of a BS-MBS system in the present embodiment.

A system architecture of the MBS system in the present embodiment will be explained with reference to FIG. 1. FIG. 1 is a view illustrating the system architecture of the MBS system in the present embodiment.

The MBS system in the present embodiment is built up by connecting a CSN (Connectivity Service Network) 10 and an ASN (Access Service Network) 15 to each other via an edge router 20. Note that the MBS system in the present embodiment may be configured to include a plurality of CSNs 10 and a plurality of ASNs 15 respectively, and the individual networks may be connected with no intermediary of the edge router 20.

<CSN>

The CSN 10 is configured by connecting a router, an AAA (Authentication Authorization Accounting) proxy server, a user database, an interworking gateway, etc, respectively (unillustrated). The CSN 10 provides an IP (Internet Protocol) connection service etc for a WiMAX subscriber (e.g., a mobile terminal 60) provided with a WiMAX service. Further, the CSN 10 provides a variety of contents such as a news program, a sport program, a weather forecast and traffic information as the WiMAX service through the multicast communications. The respective contents to be provided are assigned multicast addresses different from each other, and the CSN 10 manages a relative table between the respective contents and the multicast addresses. This relative table may be retained adjustably beforehand in the memory etc of the CSN 10. The description of the communication service provided by the CSN 10 is about a service based on the multicast communications, however, the MBS system can provide other types of communication services.

The CSN 10 is connected to the ASN 15 via the edge router 20. This connection involves utilizing, e.g., the IP. The CSN 10 transmits, to the edge router 20, a should-be-provided content as a multicast packet having a setting of a multicast address assigned with respect to the content.

<Edge Router>

The edge router 20 is connected to a plurality of ASN gateways 30 under management and manages information on the multicast communications for distributing the content transmitted from the CSN 10. The edge router 20 treats each of the ASN gateways 30 under the management as a host participating in a multicast group. The edge router 20 independently processes a multicast group management message, thereby controlling a procedure for each ASN gateway 30 to participate in or leave the predetermined multicast group.

<ASN>

The ASN 15 is configured by connecting the ASN gateway 30 and the base stations 50. The mobile terminal 60 performs wireless communication with the base station 50 covering a communication-enabled area where the mobile terminal 60 exists, thereby connecting the MBS system according to the present embodiment and thus getting provided with the WiMAX service. Each of the devices constructing the ASN 15 will hereinafter be described.

<<ASN Gateway>>

The ASN gateway 30 is a gateway device including a CPU (Central Processing Unit), a memory, an input/output interface, etc. The ASN gateway 30 is connected to the plurality of base stations 50 under management. An example in FIG. 1 is that the ASN gateway 30 is connected to each of base stations BS1, BS2, BS3, BS4 and BS5. The ASN gateway 30 groups the base stations 50 under the management into predetermined MBS zones, thus controlling the multicast communications according to the MBS zone. The example in FIG. 1 shows that the base stations BS1, BS2 and BS3 are managed as a MBS zone #1, and the base stations BS4 and BS5 are managed as a MBS zone #2.

Figure 2:
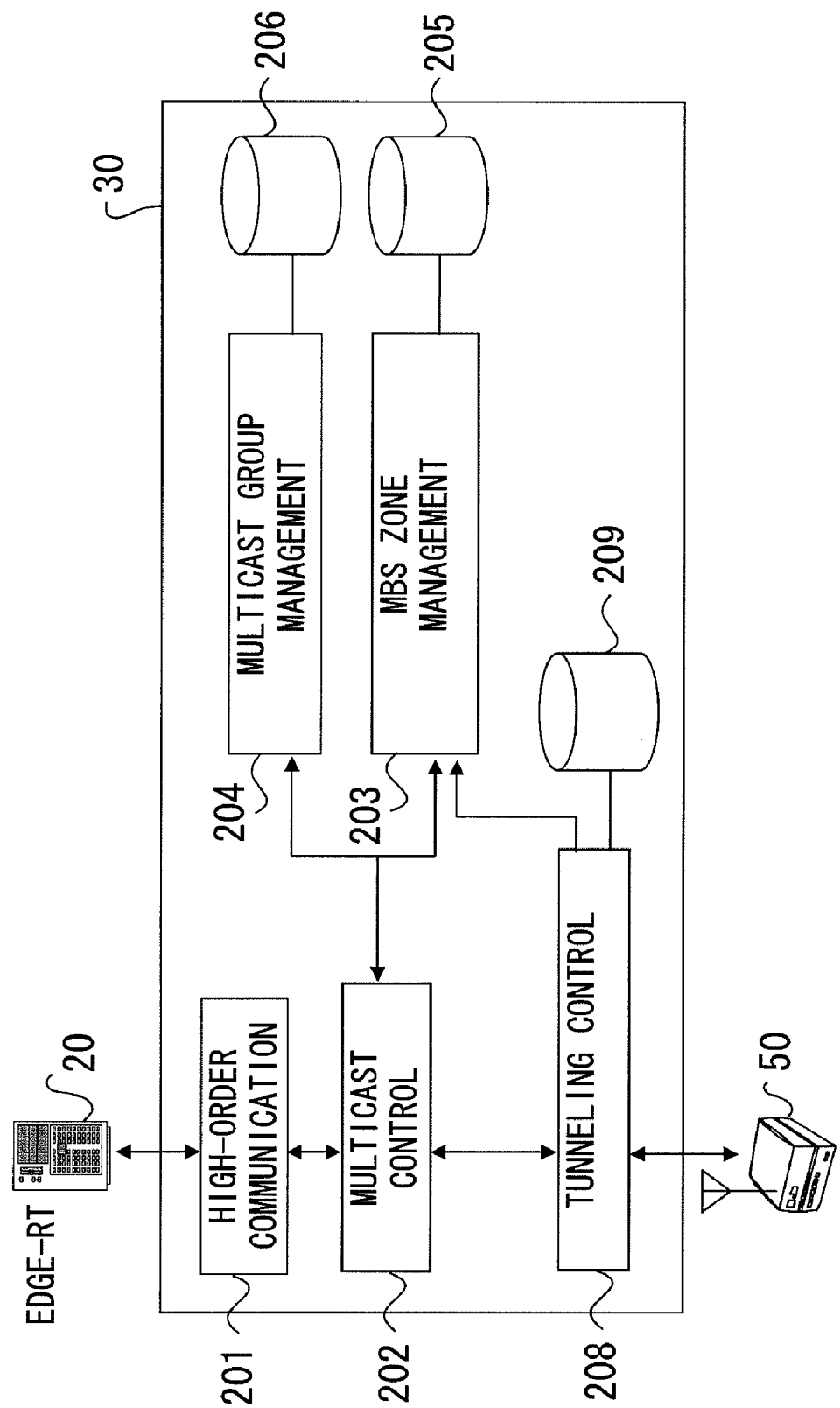
FIG. 2 is a diagram illustrating a functional configuration of an ASN gateway.

A device configuration of the ASN gateway 30 will hereinafter be explained with reference to FIG. 2. FIG. 2 is a block diagram illustrating the functional configuration of the ASN gateway 30. The ASN gateway 30 has a high-order communication unit 201, a multicast control unit 202, a MBS zone management unit 203, a multicast group management unit 204, a tunneling control unit 208, a MBS zone management database 205, a multicast group management database 206, a tunnel information database 209, etc.

The high-order communication unit 201 controls the multicast communications with the edge router 20. To be specific, the high-order communication unit 201 receives the multicast packet containing the content information transmitted from the edge router 20, and transfers the received multicast packet to the multicast control unit 202. Further, the high-order communication unit 201 transmits a packet for multicasting to the edge router 20. Note that the high-order communication unit 201 may process data other than the multicast packet.

The multicast control unit 202 works in cooperation with the high-order communication unit 201, the MBS zone management unit 203, the multicast group management unit 204 and the tunneling control unit 208, thereby controlling the multicast communications for distributing the content information transmitted from the CSN 10 to the mobile terminals 60. Each mobile terminal 60 needs to participate in the predetermined multicast group in order to receive distribution of a desired content. The multicast control unit 202 controls the procedure for each mobile terminal 60 to participate in or leave the predetermined multicast group. For instance, the multicast control unit 202 controls IGMP (Internet Group Management Protocol) or MLD (Multicast Listener Discovery) utilized as the procedure described above. The multicast control unit 202 processes a JOIN message (membership report message), a LEAVE message, a membership query (Group Specific) message (which will hereinafter be referred to as a GS-query message), a membership query (General) message (which will hereinafter be termed a G-query message), etc as multicast group management messages used by the protocol given above.

Moreover, the multicast control unit 202 processes the multicast data containing the content information transmitted from the CSN 10. The multicast control unit 202 transfers, in the multicast group management message and the multicast data, the multicast packet that should be transmitted to the edge router 20 to the high-order communication unit 201 and transfers the multicast packet that should be transmitted to the mobile terminal 60 to the tunneling control unit 208 together with the information about the MBS zone serving as a transmission destination. In-depth descriptions of the multicast group management message and the multicast data, which are to be processed in the multicast control unit 202, will be made later on.

The MBS zone management unit 203 refers to the MBS zone management database 205 and thus manages the information on the zones to which the respective base stations 50 belong. The MBS zone management unit 203 refers to a MBS zone information table within the MBS zone management database 205. FIG. 3 is a diagram showing an example of the MBS zone information table within the MBS zone management database 205. The MBS zone information table retains pieces of information on the MBS zones to which the respective base stations belong. The MBS zone information table may be previously set up and may also be updated dynamically through the communications.

The multicast group management unit 204 manages, based on the multicast group management message processed by the multicast control unit 202, the respective pieces of information about the multicast groups in which the mobile terminals 60 within the MBS zones participate with respect to every MBS zone. This management involves making use of the multicast group management database 206.

FIG. 4 is a diagram showing a multicast-group information table within the multicast group management database 206. The multicast group management unit 204 retains, for every multicast group and every MBS zone, a multicast address, MBS zone information and last responder information in the multicast group information table. What is retained as the last responder information is information about the base station that relayed last a request for the participation (JOIN message) in the same multicast group within the same MBS zone.

The tunneling control unit 208 controls how a GRE (Generic Routing Encapsulation) tunnel is generated and cancelled, and processes the multicast communications with the base station 50 via the GRE tunnel. Specifically, the tunneling control unit 208 transmits the multicast packet sent from the multicast control unit 202 to the predetermined base station 50 via the GRE tunnel. At this time, the tunneling control unit 208 similarly, if the multicast packet is either the multicast group management message or the multicast data, transmits the multicast packet to the predetermined base station 50 via the GRE tunnel. Further, the tunneling control unit 208 receives a frame sent via the GRE tunnel from the base station 50 and transfers the received frame data to the multicast control unit 202. In the MBS system, when the multicast group management message and the multicast data are transferred and received between the CSN 10 and the mobile terminal 60, the communications between the base station 50 and the ASN gateway 30 involve using the GRE tunnel. Note that details of the GRE tunneling protocol are as defined by RFC2784 and RFC2890, and its description is herein omitted.

The tunneling control unit 208 at the initial operation time generates, based on the information in the tunnel information database 209, a downlink GRE tunnel utilized for the multicast communications flowing to each base station 50. The downlink GRE tunnels utilized for the communications flowing to the base stations 50 from the ASN gateway 30 are generated by, e.g., a numerical value obtained from multiplying the number of the base stations 50 connected to the ASN gateway 30 by the number of the contents to be provided.

FIG. 5 is a diagram showing an example of a tunnel information table within the tunnel information database 209. The tunnel information table stores items of information about the should-be-generated GRE tunnels. The items of information stored in this tunnel information table are a GRE key defined as an identifier, a multicast address utilizing the GRE tunnel and should-be-generated destination MBS zone information (ZONE#1, ZONE#2, ZONE#3 in FIG. 5) with respect to every GRE tunnel.

The tunneling control unit 208, when receiving the should-be-transmitted multicast packet and the information on the transmitting destination MBS zone from the multicast control unit 202, requests the MBS zone management unit 203 to acquire the information about the base stations 50 belonging to the transmitting destination MBS zone. The tunneling control unit 208 copies the multicast packet by a number corresponding to the acquired number of the base stations 50. The tunneling control unit 208 attaches a predetermined header such as a GRE header to the copy of the multicast packet, and thereafter transmits the thus-generated frame via the GRE tunnel established between each of the base stations 50 and the ASN gateway 30.

At this time, the tunneling control unit 208 sets timing information associated with the transmitting destination MBS zone in this GRE header. The timing information is used for the individual base stations 50 belonging to the same MBS zone to simultaneously wirelessly transmit the same message sent from the ASN gateway 30. Further, the timing information is generated from maximum delay time in each MBS zone, which is calculated based on processing delay time, communication delay time, etc collected from each of the base stations 50 belonging to the individual MBS zones by, e.g., an unillustrated function unit. It should be noted that the present invention does not limit a method of generating the timing information, and this timing information may be enough if used for the same multicast data to be simultaneously transmitted through the wireless communications from the base stations belonging to the same MBS zone.

Each of the messages processed by the multicast control unit 202 will hereinafter be described with reference to FIGS. 6 through 12.

FIG. 6 is a diagram illustrating the JOIN message sent to the ASN gateway 30 from the base station 50. The JOIN message is a message sent, on the occasion of participating in the multicast group, from the mobile terminal 60 in a way that assigns a multicast address of a want-to-participate-in multicast group, and a message type of the JOIN message is the same as of a membership report message. FIG. 6 illustrates a frame structure when the base station 50 receiving the JOIN message from the mobile terminal 60 transmits this JOIN message via the GRE tunnel. The frame is formed by attaching predetermined headers 302 (the GRE header, an IP header and a L2 (Layer-2) header) to a membership report packet 301 sent from the mobile terminal 60. A multicast address of the want-to-participate-in multicast group is entered in a group address field of the membership report packet 301.

The multicast control unit 202, upon receiving the JOIN message, refers to a SA (Sender Address) field of the IP header and thus specifies the sender base station. The multicast control unit 202 acquires the MBS zone, to which the specified base station belongs, from the MBS zone management unit 203. The multicast control unit 202 extracts the multicast address from the group address field in an IGMP part of the received membership report packet 301. The multicast control unit 202 requests the multicast group management unit 204 to check whether or not the extracted multicast address has already been stored in the multicast group information table.

If the multicast address has already been stored in the multicast group information table with respect to the MBS zone, the multicast control unit 202 transfers, to the multicast group management unit 204, the respective pieces of information about the sender base station 50 and the MBS zone to which the sender base station 50 belongs. The multicast group management unit 204 updates, based on these pieces of information, the last responder information into the information about the sender base station 50 in a record of the target multicast address and the target MBS zone within the multicast group information table.

Note that if only the records of the different MBS zones exist even when the target multicast address is stored, the multicast group management unit 204 adds a new record to the multicast group information table and thus registers these pieces of information.

Whereas if the multicast address is not yet set in the multicast group information table, the multicast control unit 202 extracts the membership report packet 301 from the frame, then sets an IP address of the self-device (the ASN gateway 30) in the SA field of the IP header part of the extracted packet, and transfers this packet to the high-order communication unit 201 so as to forward the same packet to the edge router 20. FIG. 7 is a diagram showing the JOIN message sent to the edge router 20 from the ASN gateway 30. As shown in FIG. 7, the membership report packet, in which the ASN gateway 30 is set as Sender, is attached with the L2 header and is then transmitted to the edge router 20.

Next, FIG. 8 is a diagram illustrating a membership query (Group Specific) message transmitted to the base station 50 from the ASN gateway 30. The GS-query message is a message sent for checking existence of the mobile terminal 60 (receiving the multicast message of which a specified multicast address is designated) participating in a specified multicast group. The ASN gateway 30 sends the GS-query message related to each multicast group set in the multicast group information table to each of the MBS zones set in the same table.

At this time, the multicast control unit 202 generates a GS-query packet 701 as illustrated in FIG. 8. In the GS-query packet 701, an existence checking target multicast address is set in a group address field of the IGMP part and in a DA (Destination Address) field of the IP header part. The multicast control unit 202 transfers the generated GS-query packet 701 to the tunneling control unit 208. The tunneling control unit 208 copies the GS-query packet 701, corresponding to the number of the base stations belonging to the transmitting destination MBS zone, then attaches predetermined headers 702 to each of the copies of the GS-query packet 701, and transmits each of the thus-generated frames to the individual base stations 50 via the GRE tunnels. At this time, the tunneling control unit 208 sets the timing information associated with the transmitting destination MBS zone in the GRE header part of the headers 702.

FIG. 9 is a diagram showing the membership report message sent to the ASN gateway 30 from the base station 50 as a response to the GS-query message. The membership report message is a message sent from the mobile terminal 60 if the mobile terminal 60 receiving the GS-query message continues to participate in the multicast group set therein. FIG. 9 illustrates a frame structure on such an occasion that the base station 50 receiving the membership report message from the mobile terminal 60 sends this message via the GRE tunnel. This frame is formed by attaching predetermined headers 802 (a GRE header, an IP header and a L2 header) to a membership report packet 801 transmitted from the mobile terminal 60. A multicast address continuing its participation is set in a DA field and in a group address field of the membership report packet 801.

The multicast control unit 202, upon receiving the membership report message, checks the existence of the mobile terminal 60 continuing the participation about the multicast address set in the group address field of the IGMP part of the membership report packet 801. Thereafter, the multicast control unit 202 transfers the membership report packet 801 to the tunneling control unit 208. The tunneling control unit 208 attaches predetermined headers to the membership report packet 801, and transmits the thus-generated frame via the GRE tunnels to the individual base stations 50 belonging to the MBS zone, which are registered in the multicast group. Owing to this scheme, the multicast control unit 202 recognizes that the mobile terminals 60 existing in the same MBS zone and participating in the same multicast group have no necessity of sending the membership report message any more.

While on the other hand, the multicast control unit 202, if receiving none of the membership report message for a predetermined period of time, recognizes that there exist none of the mobile terminals 60 participating the multicast group in that MBS zone, and notifies the multicast group management unit 204 of this purport. The multicast group management unit 204 deletes the record related to the multicast group about the MBS zone concerned. Note that the multicast control unit 202 may retransmit, in the case of recognizing that any mobile terminal 60 participating in the multicast group does not exist, the GS-query message a plural number of times.

Next, FIG. 10 is a diagram illustrating a LEAVE message sent to the ASN gateway 30 from the base station 50. The LEAVE message is a message sent from the mobile terminal 60 on the occasion of leaving the participating multicast group. FIG. 10 illustrates a frame structure on such an occasion that the base station 50 receiving the LEAVE message from the mobile terminal 60 sends the LEAVE message via the GRE tunnel. This frame is formed by attaching predetermined headers 902 (a GRE header, an IP header and a L2 header) to a LEAVE packet 901 transmitted from the mobile terminal 60. A multicast address of a want-to-leave is entered in a group address field of the LEAVE packet 901.

The multicast control unit 202, when receiving the LEAVE message, specifies the sender base station by referring to the SA field of the IP header. The multicast control unit 202 acquires the MBS zone, to which the specified base station belongs, from the MBS zone management unit 203. The multicast control unit 202 extracts the multicast address from the group address field of the IGMP part of the received LEAVE packet 901. The multicast control unit 202 requests the multicast group management unit 204 to check based on the extracted multicast address whether the last responder in the MBS zone is identified with the sender base station or not.

The multicast control unit 202, if the sender base station is not identical with the last responder, directly terminates the process on the assumption that there exist other mobile terminals 60 participating in the multicast group. Whereas if the sender base station is the last responder, the multicast control unit 202 sends the GS-query message to the MBS zone where this base station exists in order to check whether other mobile terminals 60 participating in the multicast group exist in this MBS zone or not. The process of sending the GS-query message is the same as described above. Through this process, it is confirmed that there exists no other mobile terminal 60 participating in the LEAVE message target multicast group, and a record related to this multicast group is deleted from the multicast group information table.

The multicast control unit 202, when recognizing from the LEAVE message that the record related to the multicast group concerned is deleted from the multicast group information table, in other words, that there exists none of the mobile terminal 60 participating in this multicast group in the MBS zone concerned, extracts the LEAVE packet 901 from the frame, then enters an IP address of the self-device in the SA field of the IP header part of the extracted packet, and transfers the packet to the high-order communication unit 201 so as to forward this packet to the edge router 20. FIG. 11 is a diagram illustrating the LEAVE message sent to the edge router 20 from the ASN gateway 30. As illustrated in FIG. 11, the LEAVE packet, in which the ASN gateway 30 is set as Sender, is attached with the L2 header and is then sent to the edge router 20.

Figure 12:
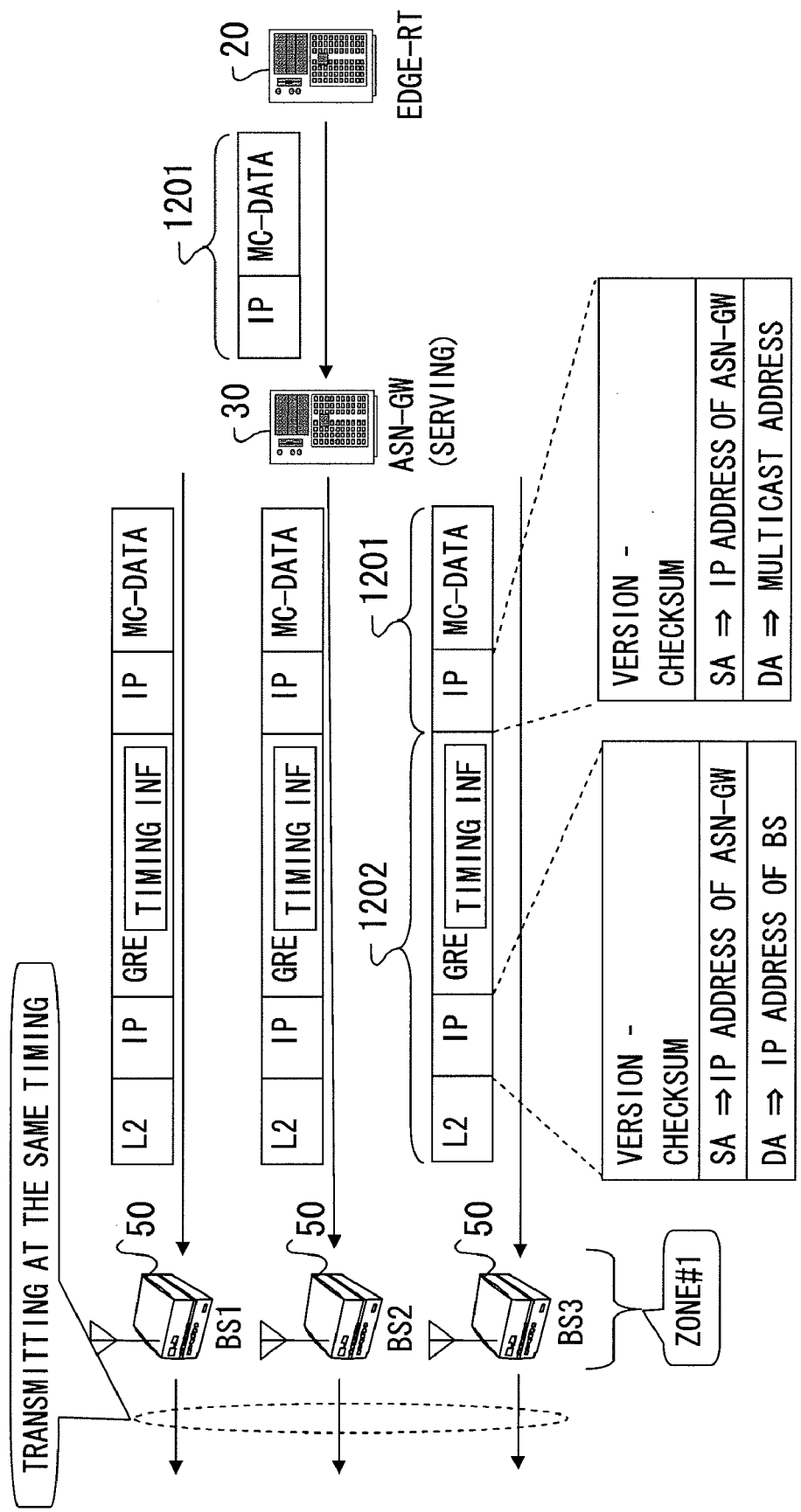
FIG. 12 is a diagram showing multicast data transmitted from a CSN and distributed to mobile terminals via the edge router, the ASN gateway and the base station.

FIG. 12 is a diagram showing multicast data transmitted from the CSN 10 and distributed to the mobile terminal 60 via the edge router 20, the ASN gateway 30 and the base station 50. Multicast data 1201 transmitted from the CSN 10, of which a multicast address associated with content information contained therein is set, is sent to the ASN gateway 30 via the edge router 20. The high-order communication unit 201 of the ASN gateway 30, when receiving the multicast data, transfers this data to the multicast control unit 202.

The multicast control unit 202 extracts the multicast address set in the DA field of the multicast data, and requests the multicast group management unit 204 for information about the MBS zone where the mobile terminal 60 participating in the multicast address exists. The multicast control unit 202 sends the information about the MBS zone, of which the multicast group management unit 204 notifies, to the tunneling control unit 208 together with the multicast data 1201.

The tunneling control unit 208 copies the multicast data 1201 by a count corresponding to the number of the MBS zones and corresponding to the number of the base stations belonging to each of the MBS zones, attaches predetermined headers 1202 to each of the copies of the multicast data 1201, and transmits the thus-generated frames to the respective base stations 50 via the GRE tunnels. At this time, the tunneling control unit 208 sets the timing information corresponding to the transmitting destination MBS zone in the GRE header part of the headers 1202. The respective base stations 50 receiving this frame within the same MBS zone wirelessly transmit the multicast data 1201 of the frame at the same timing specified by the timing information. The MBS system according to the present embodiment attaches the same headers to the multicast data when transmitted to the base station and to the previous multicast group management message also when transmitted to the base station.

<<Base Station>>

The base station 50 includes a CPU (Central Processing Unit), a memory, an input/output interface, etc, and the mobile terminals 60 within a communication area covered by the base station 50 are connected to the MBS system through the wireless communications. Further, the base station 50 is connected to the predetermined ASN gateway 30 by a cable, forwards the signals (the multicast packet) transmitted from the mobile terminal 60 to the ASN gateway 30 via the GRE tunnel, and wirelessly transmits the multicast packet sent via the GRE tunnel from the ASN gateway 30 to the mobile terminal 60. Note that a process of establishing and cancelling the wireless link between the base station 50 and the mobile terminal 60 and a process of assigning the IP address are the same as by the well-known technologies, and hence their explanations are omitted.

The base station 50 retains information (e.g., an IP address etc) about the ASN gateway 30 that manages the self-device. The base station 50 at the initial operating time generates an uplink GRE tunnel employed for the multicast communications with the ASN gateway 30 by use of the GRE tunneling protocol defined by RFC2784 and RFC2890.

The base station 50, when receiving the membership report packet 301 (see FIG. 6) (a response message to the JOIN message and to the GS-query message) and the LEAVE packet 901 (see FIG. 10) transmitted from the mobile terminal 60, generates the frame by attaching the predetermined headers 302 (the L2 header, the IP header and the GRE header) to these packets, and transmits this frame to the ASN gateway 30. At this time, the base station 50 sets an IP address of the self-device in the SA field of the IP header and sets an IP address of the ASN gateway 30 in the DA field of the IP header.

The base station 50, in the case of receiving the frame transmitted via the GRE tunnel from the ASN gateway 30, extracts the multicast packet (the GS-query packet 701 (see FIG. 8), the multicast data 1201 (see FIG. 12)) from the frame. Subsequently, the base station 50 sends the extracted multicast packet through a predetermined wireless channel at the time specified by the timing information set in the GRE header of the same frame. The timing information set in the multicast packet transmitted via the GRE tunnel from the ASN gateway 30 and in the GRE header, is the same on an every-MBS-zone basis. With this setting of the timing information, the base stations 50 belonging to the same MBS zone transmit the same multicast packet almost simultaneously.

<Mobile Terminal>

The mobile terminal 60 is a terminal device including a CPU (Central Processing Unit), a memory, an input/output interface, etc and is exemplified such as a mobile phone, a PDA (Personal Digital Assistant) and a personal computer. The mobile terminal 60 has a multicast communication function and a wireless communication function. The mobile terminal 60 performs the wireless communications with the base station 50 that covers a communication area embracing a location of the mobile terminal, corresponding to where the mobile terminal 60 exists. The mobile terminal 60 receives a variety of contents distributed by multicasting from the CSN 10 via the base station 50 with which the wireless link is established. Each mobile terminal 60 participates in the multicast group for a desired content, thereby receiving each content.

The mobile terminal 60 may download and thus retain a content-to-multicast-address relative table held previously by the CSN 10 in order to participate in a desired multicast group. Further, the mobile terminal 60 may also previously acquire an IP address for connecting to the MBS system. The present invention does not limit the method of knowing the multicast address of the content, the method of acquiring the IP address, etc, and hence their explanations are herein omitted.

Operational Example

An operational example of the MBS system in the present embodiment will hereinafter be described with reference to FIGS. 13 and 14.

Figure 13:
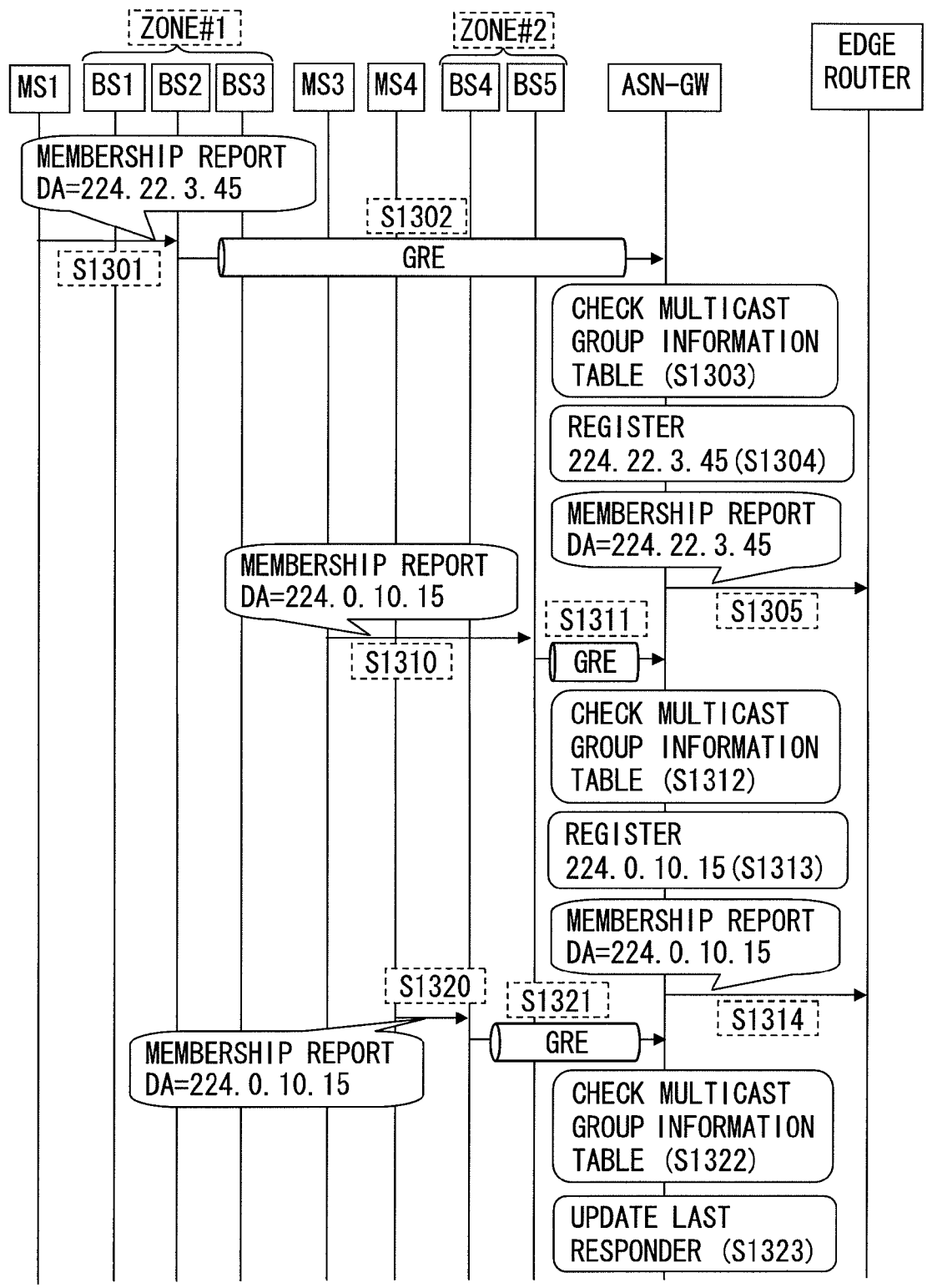
FIG. 13 is a diagram showing a process when receiving the JOIN message.
Figure 14:
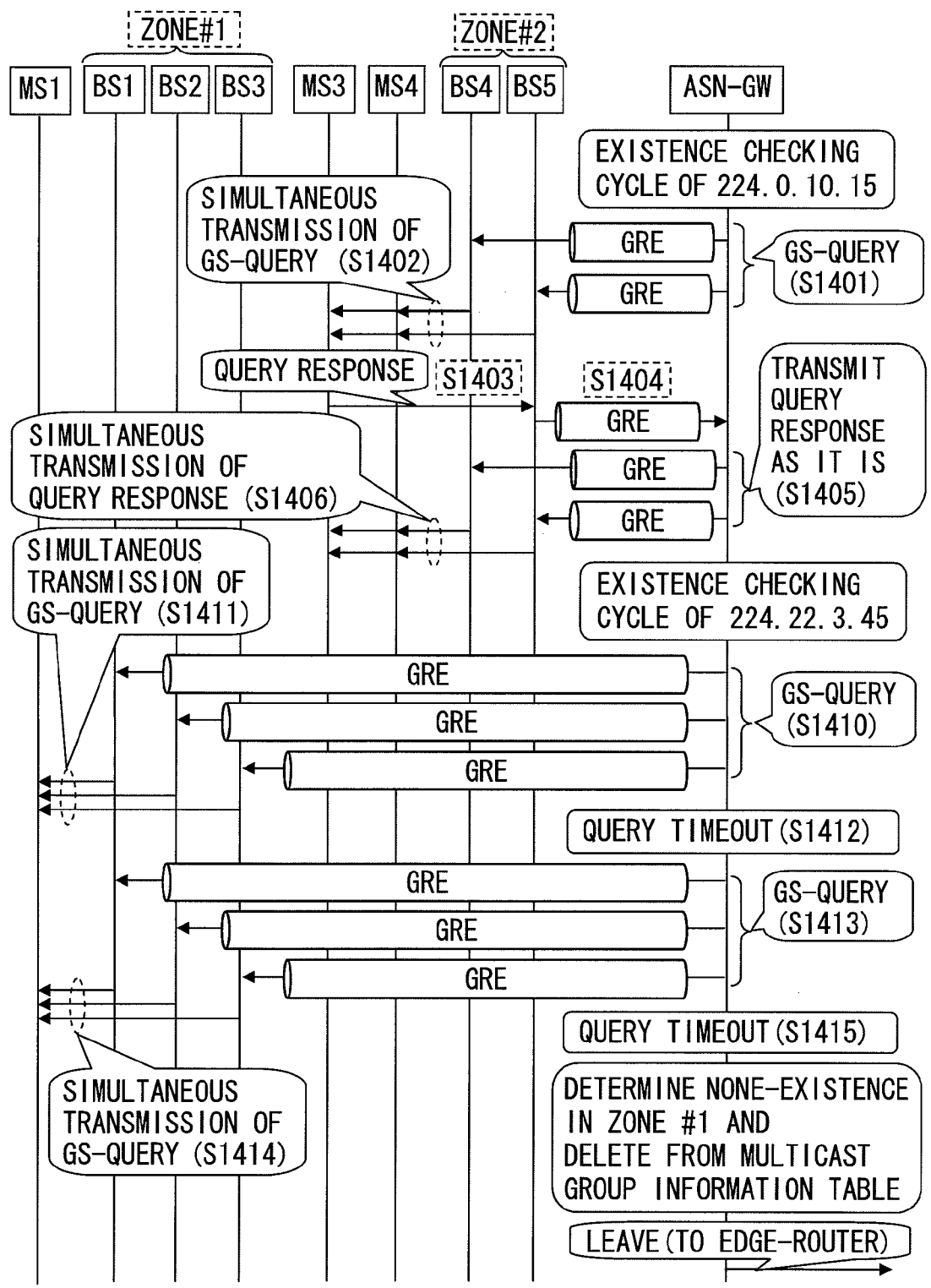
FIG. 14 is a diagram showing a process when sending the GS-query message.

The description using FIG. 13 will start with the operation in the case of transmitting the JOIN message from the mobile terminal 60. FIG. 13 is a sequence diagram showing a process when receiving the JOIN message, wherein the system architecture illustrated in FIG. 1 is exemplified. Exemplified is a case in which as the base stations 50, the BS1, BS2 and BS3 are defined to belong to the MBS zone #1, the BS4 and BS5 are defined to belong to the MBS zone #2, the MS1 as the mobile terminal 60 exists within the communication area of the BS2, and the MS3 and MS4 as the mobile terminals 60 exist within the communication area of the BS5.

The MS1 desires to participate in a multicast group (224.22.3.45), and wirelessly transmits the JOIN message in which the multicast address (224.22.3.45) is set (S1301).

The BS2, upon receiving the JOIN message signal, extracts a membership query report packet from this signal. The BS2 transmits a frame generated by attaching predetermined headers to the membership query report packet to the ASN gateway 30 via the GRE tunnel (S1302). At this time, the BS2 sets an IP address of the base station itself in the SA field within the predetermined header and sets an IP address of the ASN gateway 30 in the DA field.

The ASN gateway 30, when receiving this frame via the GRE tunnel, extracts the membership query report packet within the frame. Furthermore, the ASN gateway 30 specifies the sender BS2 on the basis of the IP address set in the SA field of the header of this frame, and recognizes based on the MBS zone information table (FIG. 3) that the MBS zone, to which the BS2 belongs, is the MBS zone #1. Subsequently, the ASN gateway 30 checks whether or not an address/zone pair of the multicast address (224.22.3.45) set in the group address field of the IGMP part in the frame and the MBS zone #1, is registered in the multicast group information table (FIG. 4) (S1303).

The ASN gateway 30, when confirming that the address/zone pair of the multicast address (224.22.3.45) and the MBS zone #1 is not registered, adds a new record to the multicast group information table and registers these pieces of information (S1304). To be specific, such a new record is added to the multicast group information table that [224.22.3.45] is set in the multicast address field, [MBS zone #1] is set in the MBS zone field, and [BS2] is set in the last responder field.

The ASN gateway 30, thereafter, attaches the L2 header to the extracted membership query report packet and thus transmits the packet to the edge router 20 (S1305). Hereat, the ASN gateway 30 sets an IP address of the gateway itself in the SA field of the IP header within this packet. With this address setting, the edge router 20 receiving this packet recognizes from the IP address set in the SA field that the ASN gateway 30 participates in the multicast group (224.22.3.45).

Next, a process, in which the plurality of mobile terminals MS3 and MS4 in the same MBS zone transmits the JOIN message, will be explained.

At first, an assumption is that the MS3 desires to participate in a multicast group (224.0.10.15) and wirelessly transmits the JOIN message in which to set the multicast address (224.0.10.15) (S1310).

The BS5, upon receiving this JOIN message signal, extracts the membership query report packet from this signal. The BS5 transmits a frame generated by attaching predetermined headers to the membership query report packet to the ASN gateway 30 via the GRE tunnel (S1311). At this time, the BS5 sets an IP address of the base station itself in the SA field of the predetermined header, and sets an IP address of the ASN gateway 30 in the DA field.

The ASN gateway 30, when receiving the frame via the GRE tunnel, extracts the membership query report packet within the frame. Further, the ASN gateway 30 specifies the sender BS5 on the basis of the IP address set in the SA field of the header of this frame, and recognizes from the MBS zone information table that the MBS zone, to which the BS5 belongs, is the MBS zone #2. Subsequently, the ASN gateway 30 checks whether or not an address/zone pair of the multicast address (224.0.10.15) set in the group address field of the IGMP part in the frame and the MBS zone #2, is registered in the multicast group information table (S1312).

The ASN gateway 30, when confirming that the address/zone pair of the multicast address (224.0.10.15) and the MBS zone #2 is not registered, adds a new record to the multicast group information table and registers these pieces of information (S1313). Specifically, such a new record is added to the multicast group information table that [224.0.10.15] is set in the multicast address field, [MBS zone #2] is set in the MBS zone field, and [BS5] is set in the last responder field.

The ASN gateway 30, thereafter, attaches the L2 header to the extracted membership query report packet and thus transmits the packet to the edge router 20 (S1314).

Next, it is assumed that the MS4 desires to participate in the same multicast group (224.0.10.15) as the MS3 does and wirelessly transmits the JOIN message in which the multicast address (224.0.10.15) is set (S1320).

The BS4, upon receiving the JOIN message signal, extracts the membership query report packet from this signal. The BS4 sends the frame generated by attaching the predetermined headers to the membership query report packet to the ASN gateway 30 via the GRE tunnel (S1321).

The ASN gateway 30, when receiving this frame via the GRE tunnel, extracts the membership query report packet in the frame. Moreover, The ASN gateway 30, as in the case of the MS3, specifies the sender BS4 of the frame, and recognizes that the MBS zone, to which the BS4 belongs, is the MBS zone #2. Subsequently, the ASN gateway 30 checks whether or not the address/zone pair of the multicast address (224.0.10.15) set in the group address field of the IGMP part in the frame and the MBS zone #2, is registered in the multicast group information table (S1322).

The ASN gateway 30, when confirming that the address/zone pair of the multicast address (224.0.10.15) and the MBS zone #2 has already been registered, updates a value in the last responder field in the target record of the multicast group information table into [BS4] (S1323), and terminates the process. With this scheme, the ASN gateway 30, in the case of receiving the JOIN message with respect to the already-registered multicast group in the same MBS zone, does not send the JOIN message to the edge router 20.

Next, an operation, in such a case that the ASN gateway 30 checks existence of the mobile terminal 60 participating in the multicast group set in the multicast group information table, will be described with reference to FIG. 14. FIG. 14 is a sequence diagram showing a process when sending the GS-query message, wherein the system architecture illustrated in FIG. 1 is exemplified.

The multicast group information table of the ASN gateway 30 shall be in a status shown in FIG. 4. The ASN gateway 30 checks the existence of each of the multicast groups entered in the multicast group information table on a predetermined cycle.

To be specific, the ASN gateway 30, for checking the existence of the multicast group (224.0.10.15), generates the GS-query packet by setting the multicast address (224.0.10.15) in the group address field of the IGMP part and in the DA field of the IP header part. The ASN gateway 30 recognizes that the MBS zone registered with respect to the multicast address is the MBS zone #2, and specifies the BS4 and BS5 as those belonging to the MBS zone #2. The ASN gateway 30 specifies the GRE tunnels generated in regard to the multicast address (224.0.10.15) between the specified base stations BS4, BS5 and the ASN gateway 30.

The ASN gateway 30 copies the GS-query packet assembled earlier, and attaches predetermined headers set for a recipient base station to each GS-query packet. The ASN gateway 30 sends the thus-generated frames to the BS4 and BS5 via the respective GRE tunnels (S1401). The timing information set in the GRE header part of each of the frames transmitted contains the same information.

The BS4 and BS5 receiving the frames simultaneously transmit the GS-query packets in these frames through predetermined wireless channels at the timing specified by the timing information set in the GRE header parts (S1402).

The MS3 and MS4 receive the GS-query packet sent from any one of the BS4 and BS5, corresponding to their locations. The MS3 and MS4, because of the same data being transmitted substantially simultaneously from the BS4 and BS5 during their movements, receive only the data transmitted from any one of the base stations. Herein, such an example is given that both of the MS3 and MS4 continuously participate in the multicast group (224.0.10.15), and the MS3 sends, ahead of MS4, the membership query report packet as a response to the GS-query.

The MS3, for indicating the continuous participation in the multicast group (224.0.10.15), wirelessly transmits a query response message in which to set the multicast address (224.0.10.15) (S1403).

The BS5, when receiving this query response message signal, extracts the membership query report packet from this signal. The BS5 sends a frame generated by attaching predetermined headers to the membership query report packet to the ASN gateway 30 via the GRE tunnel (S1404). Hereat, the BS5 sets a self IP address in the SA field of the predetermined header and sets an IP address of the ASN gateway 30 in the DA field.

The ASN gateway 30, when receiving the frame via the GRE tunnel, extracts the membership query report packet in the frame. The ASN gateway 30 refers to the multicast address (224.0.10.15) set in the group address field of the IGMP part within the frame. Furthermore, the ASN gateway 30 specifies the sender BS5 of this frame, and recognizes from the MBS zone information table that the MBS zone, to which the BS5 belongs, is the MBS zone #2. With this scheme, the ASN gateway 30, as a response to the GS-query message sent earlier, checks that the mobile terminal 60 continuing the participation exists in the MBS zone #2 with respect to the multicast address (224.0.10.15).

After checking, the ASN gateway 30 specifies the BS4 and BS5 as the base station belonging to the MBS zone #2, and specifies the GRE tunnels generated about the multicast address (224.0.10.15) between the specified BS4, BS5 and the ASN gateway 30. The ASN gateway 30 copies the extracted membership query report packet as it is, and, after attaching predetermined headers to each of the copies of the packet, transmits the thus-generated frames to the BS4 and BS5 via the specified GRE tunnels (S1405). The timing information set in the GRE header part of each of the frames transmitted contains the same information.

The BS4 and BS5 receiving the frames simultaneously transmit the membership query report packets in these frames through predetermined wireless channels at the timing specified by the timing information set in the GRE header parts (S1406).

The MS3 and MS4 receive the membership query report packets sent from any one of the BS4 and BS5, corresponding to their locations. The MS4 thereby recognizes no necessity of making a response to the GS-query packet received earlier, and does not wirelessly transmit the query response message. This is because the ASN gateway 30 checks a status of the participation in each of the multicast groups on every MBS zone basis, and the other mobile terminal MS3 existing in the same MBS zone has already notified of participation continuing information.

Given next is a description of a case in which the ASN gateway 30 checks, based on the multicast group information table, the existence of the multicast group (224.22.3.45) about the MBS zone #1. Herein, such a case is exemplified that the MS1 existing in the MBS zone #1 cancels the participation in the multicast group (224.22.3.45).

The ASN gateway 30 generates, for checking the existence of the multicast group (224.22.3.45), the GS-query packet in which the multicast address (224.22.3.45) is set in the group address field of the IGMP part and in the DA field of the IP header part. The ASN gateway 30 recognizes that the MBS zone registered with respect to the multicast address is the MBS zone #1, and specifies the BS1, BS2 and BS3 as the base station belonging to the MBS zone #1. The ASN gateway 30 specifies the GRE tunnels generated with respect to the multicast address (224.22.3.45) between the specified BS1, BS2, BS3 and the ASN gateway 30.

The ASN gateway 30 copies the GS-query packet generated earlier, and attaches predetermined headers set for the destination base station to each GS-query packet. The ASN gateway 30 sends the thus-generated frames to the BS1, BS2 and BS3 via the respective GRE tunnels (S1410). The timing information set in the GRE header part of each of the frames transmitted contains the same information.

The BS1, BS2 and BS3 receiving the frames simultaneously transmit the GS-query packets in these frames through predetermined wireless channels at the timing specified by the timing information set in the GRE header parts (S1411).

The MS1 receives the GS-query packet sent from any one of the BS1, BS2 and BS3, corresponding to its location. The MS1, because of cancelling the participation in the multicast group (224.22.3.45), does not make any response to the GS-query message.

The ASN gateway 30, if the response to the GS-query message transmitted earlier is not sent for a predetermined timeout period, temporarily determines that any mobile terminal 60 continuing the participation in the multicast group (224.22.3.45) does not exist in the MBS zone #1 (S1412). The ASN gateway 30 retransmits the same GS-query message as the message transmitted earlier to the MBS zone #1 (S1413).

The ASN gateway 30, if there no response to the retransmitted GS-query message, determines that none of the mobile terminal 60 continuing the participation in the multicast group (224.22.3.45) exists in the MBS zone #1, and deletes a target record from the multicast group information table. Subsequently, the ASN gateway 30 checks whether or not the records associated with other MBS zones in regard to the multicast group (224.22.3.45) are registered in the multicast group information table. The ASN gateway 30, when confirming that none of the records associated with other MBS zones are registered therein, sends the LEAVE message about the multicast group (224.22.3.45) to the edge router 20.

The edge router 20 receiving the LEAVE message recognizes that the ASN gateway 30 has left the multicast group (224.22.3.45). This has the same meaning as recognizing that the mobile terminals 60 existing under the ASN gateway 30 include none of the mobile terminals 60 continuing the participation in the multicast group.

Note that a processing sequence in the case of transmitting the LEAVE message from the mobile terminal 60 is that when the ASN gateway 30 receives the LEAVE message, the GS-query message described above is sent. Subsequent processes are the same as those of the processing sequence shown in FIG. 14, and hence the explanation is omitted.

Operations and Effects in the Present Embodiment

Herein, operations and effects of the MBS system in the present embodiment discussed above will be described.

In the MBS system according to the present embodiment, when the JOIN message (the request for participating in the predetermined multicast group) sent from the mobile terminal 60 is transmitted to the ASN gateway 30 through the base station 50, the multicast group information table stores the information on the MBS zone to which the base station belongs, the base station relaying the JOIN message with respect to the multicast group at which the JOIN message is targeted.

Further, on the occasion of periodically checking the existence (participation continuing) status of each of the multicast groups stored in the multicast group information table, the GS-query message is sent to each of the base stations 50 belonging to the MBS zones set in the same table, the wireless transmission from the individual base stations 50 belonging to the MBS zone is made at the same timing.

Namely, the MBS system in the present embodiment is such that the ASN gateway 30 manages the information on the multicast group in which the mobile terminals 60 participate according to every MBS zone to which the base station performing the wireless communications with the mobile terminal 60 belongs.

With this scheme, in the case of transmitting the JOIN messages related to the same multicast group from the plurality of mobile terminals 60 existing under the management of the same MBS zone, it may simply be enough that any one of the messages is processed by the ASN gateway 30, and other messages do not need transferring to the high-order device from the ASN gateway 30.

Therefore, according to the present embodiment, a traffic size of the MBS system as a whole can be reduced on the occasion of providing the multicast communication services to the mobile terminals 60.

Further, as for the existence check, the GS-query messages are simultaneously transmitted on every MBS zone basis with respect to the multicast groups stored in the multicast group information table in the same way as about the multicast data (contents), and hence the existence check can be normally implemented if the mobile terminal 60 exists in the same MBS zone even when moving.

Moreover, the MBS system in the present embodiment involves using the GRE tunnels via which to transmit and receive the multicast group management messages between the ASN gateway 30 and the individual base stations 50. The multicast group management message is processed, owing to the use of this GRE tunnel, in the same way as the user data (the multicast data to the user) is processed. To be specific, the respective base stations 50 belonging to the same MBS zone simultaneously wirelessly transmit the multicast group management messages in a way that sets the predetermined timing information in the GRE headers attached to the multicast group management messages.

Thus, the MBS system in the present embodiment involves employing the same method as transmitting the user data for multicasting on the occasion of sending the multicast group messages, whereby the multicast management protocol can be normally implemented if the mobile terminal 60 exists in the same MBS zone even when moving, and the participation continuing status can be normally grasped. Further, the multicast group management messages required for the mobile terminals 60 to move can be reduced to the greatest possible degree.

This scheme, according to the present embodiment, enables the multicast communications to be efficiently performed in the MBS system targeting at the mobile terminals 60 based on the premise that the terminals 60 are to move.

OTHERS

The disclosures of Japanese patent application No. JP2006-300299, filed on Nov. 6, 2006 including the specification, drawings and abstract are incorporated herein by reference.

What is claimed is:

1. A relay device comprising:
a memory which stores information sets each including multicast group information indicative of a multicast group in which a mobile terminal participates and zone information indicative of a zone to which a plurality of base stations, including a base station performing wireless communications with the mobile terminal, belong; and
a processor which executes processes comprising:
first generating at least one query packet, for checking whether there is any mobile terminal that continues to participate in a checking target multicast group, in which information indicative of the checking target multicast group is set;
specifying, from the information sets stored in the memory, an information set including multicast group information indicative of the checking target multicast group;
second generating user data packets each containing a generated query packet from the first generating and same timing information specifying timing at which the query packet is to be transmitted from a base station; and
transmitting the user data packets to base stations belonging to a zone identified by zone information included in the specified information set, respectively.

2. The relay device according to claim 1, wherein the processor judges, when receiving a JOIN packet, sent from a mobile terminal, for a request for participating in a multicast group via a base station, whether or not the memory stores an information set including multicast group information indicative of the multicast group and zone information indicative of a zone to which the base station belongs, and
the processor stores the information set in the memory and transfers the JOIN packet to a high-order device when judging that the memory does not store the information set, but does not transfer the JOIN packet when judging that the memory stores the information set.

3. A wireless communication system comprising:
a plurality of base stations managed in the way of being grouped into zones; and
a relay device;
the relay device including,
a memory which stores information sets each including multicast group information indicative of a multicast group in which a mobile terminal participates and zone information indicative of a zone to which a plurality of base stations, including a base station performing wireless communications with the mobile terminal, belong; and
a processor which executes processes comprising:
first generating at least one query packet, for checking whether there is any mobile terminal that continues to participate in a checking target multicast group, in which information indicative of the checking target multicast group is set;
specifying, from the information sets stored in the storing unit, an information set including multicast group information indicative of the checking target multicast group;
second generating a user data packets each containing a generated query packet from the second generating and same timing information specifying timing at which the query packet is to be transmitted from a base station; and
transmitting the user data packets to base stations belonging to a zone identified by zone information included in the specified information set, respectively,
wherein each of base stations receiving the user data packet containing the query packet transmitted from the relay device wirelessly transmits the query packet contained in the user data packet at tinning specified by the timing information in the user data packet.

4. The wireless communication system according to claim 3, wherein the processor judges, when receiving a JOIN packet, sent from a mobile terminal, for a request for participating in a multicast group via a base station, whether or not the memory stores an information set including multicast group information indicative of the multicast group and zone information indicative of a zone to which the base station belongs, and
the processor stores the information set in the memory and transfers the JOIN packet to a high-order device when judging that the memory does not store the information set, but does not transfer the JOIN packet when judging that the storing unit stores the information set.

5. A multicast relay method comprising:
storing, in a storing unit that stores a plurality of information sets, an information set including multicast information indicative of a multicast group in which a mobile terminal participates and zone information indicative of a zone to which a plurality of base stations, including a base station performing wireless communications with the mobile terminal, belong;
first generating at least one query packet, for checking whether there is a mobile terminal that continues to participate in a target multicast group, in which information indicative of the target multicast group is set;
specifying, from the information sets stored in the storing unit, an information set including the multicast group information indicative of the target multicast group is set;
second generating user data packets each containing a generated query packet from the first generating and same timing information specifying timing at which the query packet is to be transmitted from a base station; and
transmitting the user data packets to base stations belonging to a zone identified by zone information included in specified information set, respectively.

6. The multicast relay method according to claim 5 further comprising judging, when receiving a JOIN packet, sent from a mobile terminal, for a request for participating in multicast group via a base station, whether or not the storing unit stores an information set including multicast group information indicative of the multicast group and zone information indicative of a zone to which the base station belongs,
wherein the storing stores, in the storing unit, the information set and transfers the JOIN packet to a high-order device when it is judged in the judging that the storing unit does not store the information set, but transfers none of the received JOIN packet when it is judged in the judging that the storing unit stores the information set.

* * * * *